United States Patent [19]
Badura

[11] Patent Number: 4,992,120
[45] Date of Patent: Feb. 12, 1991

[54] IMAGE FORMATION ON GLASS SURFACES

[76] Inventor: Robert R. Badura, 7072 S. Sunshine St., Las Vegas, Nev. 89118

[21] Appl. No.: 491,032

[22] Filed: Mar. 9, 1990

[51] Int. Cl.[5] ........................ B32B 31/00; B32B 35/00; B44C 1/22; B29C 37/00

[52] U.S. Cl. ........................................ 156/62; 156/630; 156/633; 156/655; 156/658; 156/668

[58] Field of Search ............... 156/630, 633, 655, 658, 156/663, 668, 62

[56] References Cited

U.S. PATENT DOCUMENTS 3,483,027 12/1969 Ritzerfeld et al. .............. 156/658 X
4,652,337 3/1987 Picone et al. ........................ 156/654

*Primary Examiner*—Wiliam A. Powell

[57] ABSTRACT

A process for forming a line type image on the surface of a glass pane. A film of transparent tinted plastic material is adhesively attached to the face of the glass pane; thereafter a heated stylus is operated in "pencil" fashion to burn a line through the plastic film. An image is thus formed on the plastic surface.

6 Claims, 1 Drawing Sheet

IMAGE FORMATION ON GLASS SURFACES

BACKGROUND AND SUMMARY OF THE INVENTION

This invention relates to a process for forming images on glass surfaces. The images can be in the form of words, or numbers, or decorative scrollwork, or a person's portrait, flowers, etc. depending on the situation and desired purpose. The glass surface can be an automobile window, or a window in a home or place of business, or a framed glass pane adapted to be displayed in a home, or a wall mirror.

It is already known that images can be formed on glass surfaces by etching an image with chemicals. U.S. Pat. No. 4,652,337 to Picone et al shows the use of stencils to mask areas of a glass surface. A paste-like etching composition can be applied by a brush to the cut outs of the stencils so as to etch the exposed glass areas.

The present invention contemplates the use of a thin tinted plastic film on a glass surface. An electric-heated stylus is manipulated so that the tip of the stylus burns or melts surface areas of the plastic film in direct contact with the stylus. Other areas of the plastic film are unaffected.

In a preferred practice of the invention a pattern is formed on a sheet of tracing paper. That sheet is temporarily attached to a rear surface of the glass pane. An electric light is arranged behind the glass pane to shine through the tracing paper and glass pane, such that the pattern is visible through the tinted plastic film on the front face of the pane. The pattern is used as a guide for proper manipulation of the stylus along the exposed surface of the plastic film. After the image has been formed on the plastic surface the sheet of tracing paper is removed from the rear face of the glass pane.

The process of the invention represents a relatively low cost method of forming images on glass surfaces. The use of a tracing paper as a pattern is advantageous in that it eliminates errors that could otherwise obscure, damage or deface the final work product.

THE DRAWINGS

DESCRIPTION OF A PREFERRED EMBODIMENT OF THE INVENTION

Figure 1:
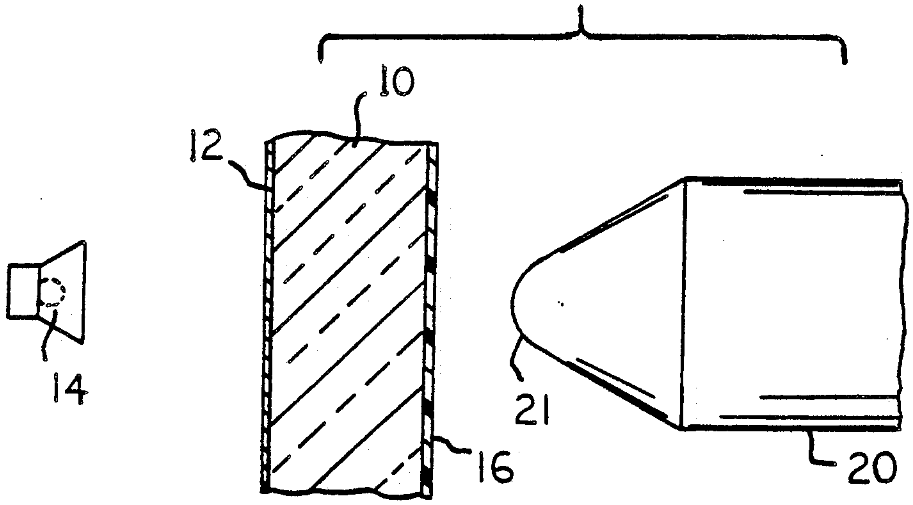
FIG. 1 is a fragmentary sectional view through a glass pane arranged between a light source and a heated stylus, according to the present invention.

FIG. 1 shows a transparent glass pane 10 having a sheet of tracing paper 12 temporarily attached to its left face. Tracing paper is semi-transparent and light-transmitting, such that images drawn thereon will be visible through glass pane 10 when the images are properly illuminated.

Prior to attaching paper sheet 12 to pane 10 an image is drawn on the right face of the sheet. The image can be drawn with a pencil or a pen to any desired configuration, e.g. a flower, a word message, a person's likeness, etc. Paper sheet 12 can be temporarily attached to the left face of glass pane 10 with adhesive tape or plastic tape. The paper sheet should be flat against the surface of glass pane 10, such that there is substantially no air space between the drawn image and the pane surface.

In the space to the left of sheet 12, I position an electric light (lamp) 14. Light rays from the lamp impinge on sheet 12 to illuminate the image on the right face of the sheet. A person located to the right of pane 10 can readily see the image through the glass pane.

On the right face of glass pane 10 there is adhesively attached a thin film 16 of tinted transparent plastic material. The plastic is a commercially available film material commonly used on windows to minimize transmission of light and heat rays through the windows. The film can be used to reduce the need for air conditioning by minimizing heat build-up in buildings. The commercially available film material is tinted in different shades or hues, e.g. brown, blue, smoke, or yellow. Commonly the material has a thickness of about 0.003 inch. it is a flexible plastic material having a coating of water-soluble adhesive on one of its faces.

I attach the thin plastic film 16 to glass pane 10 by dipping the film in water, and spraying or wiping water on the right face of pane 10. Film 16 is pressed against the pane surface, and a squeegee is passed across the exposed face of the film to remove any air bubbles that might form in (at) the pane-film interface. The exposed face of the plastic film will be smooth and flat; after the adhesive drys the plastic film will be firmly adhered to the pane surface. The film is light-transmitting, such that a person located to the right of pane 10 can see and discern the image drawn on paper sheet 12.

An image can be formed on (in) the plastic film 16 with a heated stylus 20. The stylus can be a "pencil" type burner device that is commonly used to burn lines in wood. The wood burner device is somewhat similar to a small soldering iron. The tip area 22 of the stylus will have a temperature ranging between 100° F. and 250° F.; a rheostat associated with the burner device can be used to vary or adjust the operating temperature at the tip of the stylus.

Heated stylus 20 has an elongated plastic handle associated therewith, such that the stylus can be manually manipulated to form a line in (through) plastic film 16. The tip of the stylus is pointed to form a relatively thin line 24 in the plastic film. The formed line has a width dimension 26 of approximately 0.03 inch. In using the stylus the person traces along the lines drawn on sheet 12; the image on film 16 is a duplicate of the image drawn on sheet 12.

Line 24 is burned completely through the plastic film, such that the right face of glass pane 10 is exposed. Only the area of the plastic film in direct contact with the stylus is burned (melted). The remaining area of the plastic film is unaffected (undisturbed). FIG. 1 shows stylus 20 with a rounded tip area 21; FIG. 1 is magnified showing of the stylus tip. In an absolute sense the stylus tip has an essentially pointed character. The line 24 formed by the stylus has a width related to the configuration of the stylus tip 21. Heat emitted from the stylus tip travels only a limited distance though the plastic film material before being dissipated. The width of line 24 is only slightly greater than the width of stylus tip 21.

Figure 2:
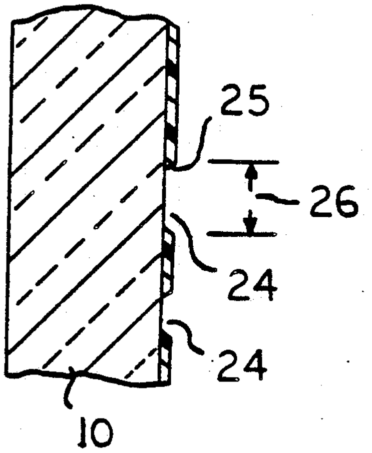
FIG. 2 is a view in the same direction as FIG. 1, after removal of a pattern from the rear (left) face of the pane.

FIG. 2 shows two lines 24 formed in the plastic film. These two lines can be relatively closely spaced, as shown in the drawing, without adversely affecting the integrity of the plastic film bordering the lines (spaces) 24. The heat emitted by the stylus does not appear to affect the bond between the plastic film and the glass surface. Also, the coloration on the film retains its original hue; there is no visible scorching or blackening of the film material.

Spaces (lines) 24 are transparent. However the flared edges 25 of the lines have a whitened appearance, such that each line presents a whitened translucent appearance. The lines have a heightened contrast with the tinted plastic film, such that the image on the right face of pane 10 is discernable, even from a distance. The image has a three dimensional appearance, due to the fact that the exposed face areas of pane 10 are inset from the exposed face of film 16. Edge areas 25 are relatively smooth and uniform in appearance.

As will be apparent from FIG. 2, tracing paper sheet 12 is removed from the left face of glass pane 10 before usage of the pane for displaying the image on (in) plastic film 16.

When the invention is employed to form images on a glass mirror, it is not possible to utilize tracing paper 12 on the mirror rear face. In that case a stencil will be employed on the front (exposed) face of the plastic film 16 to provide a pattern for the heated stylus.

I claim:

1. A process for forming an image on a transparent glass pane, comprising the steps of adhesively attaching a transparent colored film on one face of a glass pane;

drawing an image on a sheet of tracing paper;

attaching the sheet of paper onto the other face of the glass pane, with the drawn image presented to the glass pane other face;

illuminating the exposed surface of the sheet so that the image is visible to a person looking at the exposed surface of the colored film;

moving a heated stylus along the exposed surface of the colored film, using the image on the tracing paper as a pattern;

and removing the tracing paper from the glass pane.

2. The process of claim 1, wherein the stylus is heated to a temperature in excess 100° F.

3. The process of claim 1, wherein the stylus is operated to completely burn a line through the plastic film, such that the face of the glass pane is exposed where the stylus has been in contact with the film.

4. The process of claim 3, wherein the plastic film has a thickness of about 0.003 inch, and the line burned through the film has a width of about 0.03 inch.

5. The process of claim 3 wherein the stylus is configured so that the line burned through the plastic film has outwardly flared edges.

6. The process of claim 1 wherein the step of attaching the transparent film on the glass pane consist in a coating of water-soluble adhesive on the film, applying water to the adhesive surface and said one face of the glass pane, squeeging the exposed surface of the film to remove air bubbles from the film-pane interface, and allowing the adhesive to dry before attaching the sheet of paper to the other face of the glass pane.

* * * * *